Patented June 20, 1950

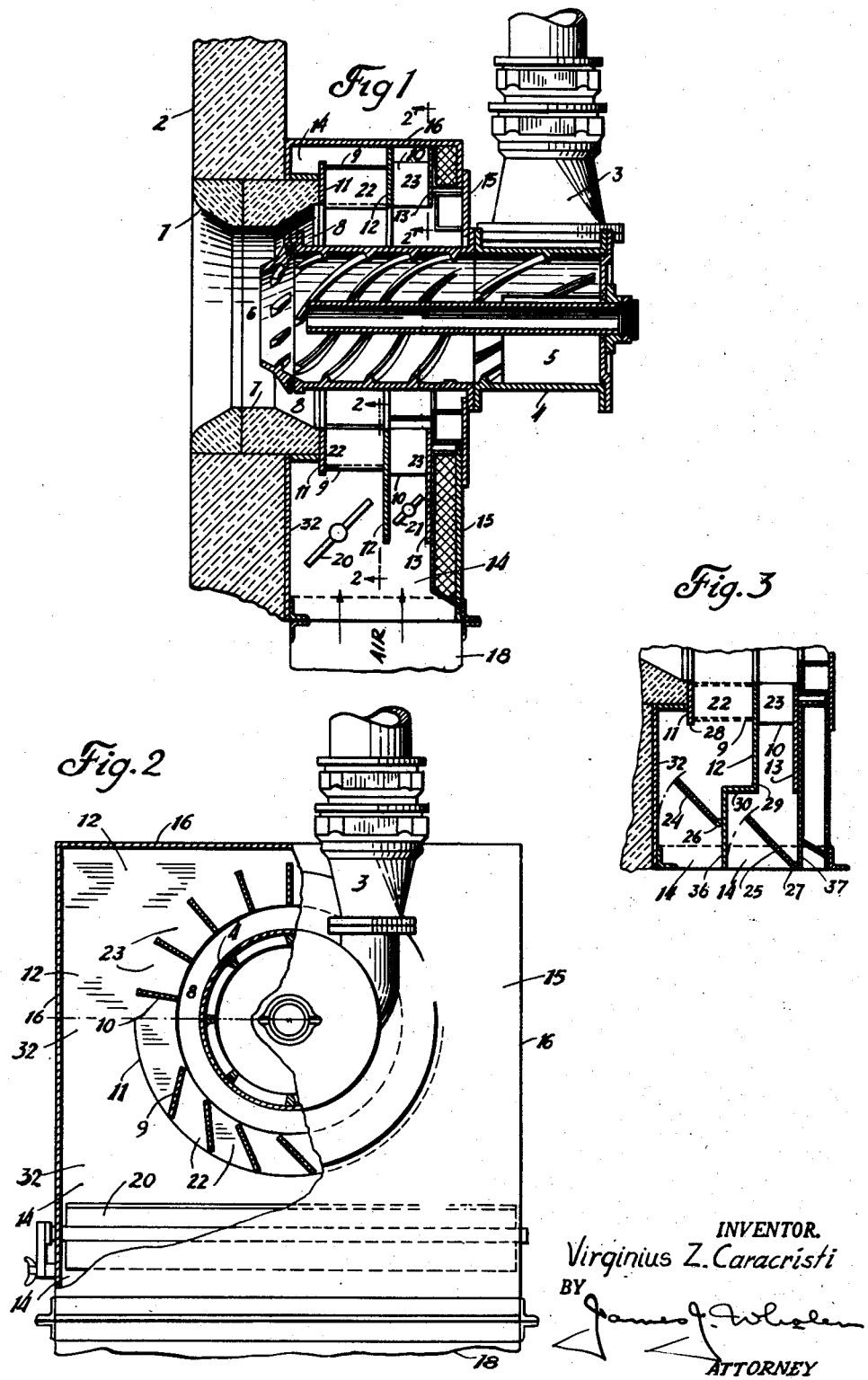

2,512,196

UNITED STATES PATENT OFFICE 2,512,196

AIR VANE FOR FUEL BURNERS

Virginius Z. Caracristi, Bronxville, N. Y., assignor, by mesne assignments, to Combustion Engineering-Superheater, Inc., a corporation of Delaware Application May 15, 1946, Serial No. 669,890

5 Claims. (Cl. 110—104)

This invention relates to means for producing whirling motion of fluids in chambers and particularly for producing variable whirling motion of air in fuel burners.

In burners of the type in which fuel is introduced into a furnace through a central horizontal tube, a substantial portion of the air for combustion is delivered separately through an annular passage surrounding the fuel tube. A whirling motion is imparted to the air flowing through the annular passage usually by a multiplicity of adjustable vanes disposed between an air supply duct and the annular passage. The angularity of these vanes controls the velocity of the whirl by varying the direction in which the air entering from the duct meets the whirling air in the annular passage. These vanes are interconnected with a system of links or gears and racks which cause all of them to turn together. Such constructions are generally elaborate and costly to make.

It is an object of this invention to provide simple and cheaply made apparatus for producing and controlling the velocity of whirl of fluids in a chamber.

Figure 1 is a longitudinal sectional view of a horizontal burner for pulverized fuel embodying the invention.

Figure 2 is a composite of the transverse half sectional views taken on the lines 2—2 and 2'—2' in Fig. 1.

Figure 3 is a fragmentary sectional view illustrating a modified arrangement of certain dampers shown in Figure 1.

In the drawings the numeral 1 designates as a whole a pulverized fuel burner mounted horizontally to introduce fuel into a furnace through its wall 2. Pulverized fuel carried in flotation in a current of primary air is supplied to the burner 1 from a duct 3 and delivered tangentially into a tube 4 forming the central passage 5 of the burner. The whirl produced by the tangential entrance of the fuel-air mixture continues beyond the open end of tube 4 and through a throat 6 formed by a refractory member 7 surrounding the burner in spaced relation thereto where it extends through the furnace wall.

Surrounding fuel tube 4 is an annular passage 8 bounded on its outer periphery in part by an outwardly extending portion of the throat member 7 and for the remaining part by two groups of circumferentially arranged deflector plates 9 and 10 fixedly supported between partition plates 11, 12, 13 mounted within a wind box 14 through whose outer end wall 15 the burner 4 projects.

The partitions 11, 12, 13 are centrally apertured to permit passage of the burner tube 4 and so as not to obstruct the annular passage 8 around the latter. These vanes are mounted in the port like passage through which the wind box communicates with the annular passage circumferentially of the latter at its outer end. The outer walls 16 of the wind box 14 are spaced outwardly from the outer edges of the rings of deflectors 9, 10 to provide a space all around the latter for the air to flow on its way to the vanes. The wind box 14 is open on one side and connects with the air supply duct 18 for furnishing "secondary air" to the annular passage 8.

The deflector plates 10 are mounted in radial planes passing through the center line of the burner and the deflector plates 9 are at an angle to these planes and substantially tangential to tube 4. Air entering the spaces 23 between deflector plates 10 flows radially into annular passage 8, while air entering spaces 22 between deflector plates 9 flows tangentially into the annular passage 8 in a whirling motion. On its lower side the partition 12 extends below the partition 11 so as to form with wall 32 of the wind box and with partition 13, respectively, duct like passages leading to the vanes 9, 10. Located in these duct like passages in the wind box 14 between the deflectors 9, 10 and the supply duct 18 are dampers 20 and 21, damper 20 controlling the air flow to the spaces 22 between deflector plates 9 and damper 21 controlling the air flow to the spaces 23 between deflector plates 10.

In Figure 3 the central partition 12 that supports both vanes 9, 10 is extended at its lower edge (via offset and continuation portions 30 and 36) to the bottom of the wind box and the dampers 24 and 25 are hinged at 26 and 27 respectively; a member 37 serving to block the space above damper 25's hinge point 27 against admission of incoming air. The edge 28 of partition 11 and the edge 29 as well as the offset portion 30 of partition 36 follow the curvature of the burner. The air flowing into the wind box is deflected by the dampers 24 and 25 respectively toward inner side 32 of the wind box 14 and toward the offset portion 30 of partition 12. When the distal ends of these dampers are closely adjacent the edge of partition 11 and the offset portion 30 of partition 12, the air must make substantially two right angle turns before reaching the deflector plates 9 and 10 and when the distal ends of these dampers are remote therefrom, the air flows through a longer but less tortuous path to reach the deflecting plates. The first mentioned air path offers a greater resistance than the second and this prevents a major portion of the air from blowing directly into the burner on the side of the dampers and thereby improves the distribution of air circumferentially around the deflector vanes.

In operation if all secondary air is admitted by damper 21 or 25 to the radial deflecting plates 10, the air will flow through the annular passage 8 without a whirling motion, while if all air is admitted by dampers 20 or 24 to the inclined deflecting plates 9, the aid will flow tangentially into the annular passage and flow therethrough with a maximum of whirling motion. By appropriate distribution of the air through the two sets of deflecting vanes any desired degree of whirling motion may be obtained in its flow through the annular passage.

While I have shown and described the preferred embodiment of my invention, it will be understood that minor changes in construction, combination and arrangement of parts may be made without departing from the spirit and scope of the invention as claimed.

What I claim is:

1. In a fuel burner, a centrally located fuel tube adapted to discharge into a furnace, means forming around said central tube an annular air passage closed at its end remote from the furnace and open at its other end for supplying air to mix with the fuel discharged into the furnace by the fuel tube, a windbox surrounding said annular passage intermediate its said closed and open ends and communicating circumferentially with the surrounded passage portion, a first set of circumferentially spaced deflecting plates positioned around one portion of the axial length of said surrounded passage portion concentrically between the annular passage and said surrounding windbox with individual plates disposed to direct inwardly flowing windbox air radially toward said central fuel tube without setting up air swirl therearound, a second set of circumferentially spaced deflecting plates positioned around another portion of the axial length of said surrounded passage portion concentrically between the annular passage and said surrounding windbox with individual second-set plates disposed to direct inwardly flowing windbox air substantially tangent to said central fuel tube whereby to set up swirling air motion therearound, means forming in said windbox first and second ducts for admitting windbox air separately into said first and second sets of deflecting plates, and damper means in said ducts for controlling the amount of air inwardly passed through each deflecting plate set whereby to govern the degree of spin imparted to the total stream of air from both plate sets which following admission into said annular passage as aforesaid flows lengthwise along the fuel tube exterior and thence out of the annular passage at its said open end.

2. In a pulverized fuel burner, a central fuel tube having a tangential inlet at one end and an axial fuel outlet at the other end, means forming around said central tube an annular air passage closed at its one end adjacent said inlet end of the fuel tube and being open at its other end to form an outlet adjacent to and concentric with said fuel tube outlet, a windbox surrounding said annular passage intermediate its said closed and open ends and communicating circumferentially therewith, a first set of deflecting plates positioned in circumferentially spaced relation around one portion of the axial length of said annular passage concentrically between said axial length portion and said surrounding windbox with individual plates disposed to direct inwardly flowing windbox air radially toward said central fuel tube without setting up air swirl therearound, a second set of deflecting plates positioned in circumferentially spaced relation around another portion of the axial length of said annular passage concentrically between that axial length portion and said surrounding windbox with individual second-set plates disposed to direct inwardly flowing windbox air substantially tangent to said central fuel tube whereby to set up swirling air motion therearound, means forming in said windbox first and second ducts for admitting windbox air separately into said first and second sets of deflecting plates, and damper means in said ducts for controlling the amount of air inwardly passed through each deflecting plate set whereby to govern the degree of spin imparted to the total stream of air from both plate sets which following admission into said annular passage as aforesaid flows lengthwise along the fuel tube exterior and thence out of the annular passage at its said open end.

3. In a fuel burner, the combination of a centrally located fuel tube adapted to discharge into a furnace, means forming around said central tube an annular air passage closed at its end remote from the furnace and open at its other end for supplying air to mix with the fuel discharged into the furnace by the fuel tube, a windbox surrounding said annular passage intermediate its said closed and open ends and communicating circumferentially with the surrounded passage portion, a first set of circumferentially spaced deflecting plates disposed around one portion of the axial length of said surrounded passage portion concentrically between the annular passage and said surrounding windbox with individual plates extending substantially radially toward the fuel tube center whereby windbox air flowing inwardly between those plates enters the annular passage without setting up swirl of air around said central fuel tube, a second set of circumferentially spaced deflecting plates disposed around another portion of the axial length of said surrounded passage portion concentrically between the annular passage and said surrounding windbox with individual second-set plates inclined substantially tangent to the fuel tube exterior whereby windbox air flowing inwardly between those second-set plates enters the annular passage in a way which does set up swirling air motion around the central fuel tube, partition means forming in said windbox first and second ducts for admitting windbox air separately into said first and second sets of deflecting plates, and damper means in said ducts for controlling the amount of air inwardly passed through each deflecting plate set whereby to govern the degree of spin imparted to the total stream of air from both plate sets which following admission into said annular passage as aforesaid flows lengthwise along the fuel tube exterior and thence out of the annular passage at its said open end.

4. In a pulverized fuel burner, the combination of a central fuel tube having a tangential inlet at one end and an axial fuel outlet at the other end, means forming around said central tube an annular air passage closed at its one end adjacent said inlet end of the fuel tube and being open at its other end to form an outlet adjacent to and concentric with said fuel tube outlet, a windbox surrounding said annular passage intermediate its said closed and open ends and communicating circumferentially therewith, a first set of deflecting plates disposed in circumferentially spaced relation around one portion of the axial length of said annular passage in concentric position between the passage and said surrounding windbox with individual plates extending substantially radially toward the fuel tube center whereby windbox air flowing inwardly between those plates enters the annular passage without setting up swirl of air around the central fuel tube, a second set of deflecting plates disposed in circumferentially spaced relation around another portion of the axial length of said annular passage in concentric position between the passage and said surrounding windbox with individual second-set plates inclined substantially tangent to the fuel tube exterior whereby windbox air flowing inwardly between those second-set plates enters the annular passage in a way which does set up swirling air motion around the central fuel tube, partition means forming in said windbox first and second ducts for admitting windbox air separately into said first and second sets of deflecting plates, and damper means in said ducts for controlling the amount of air inwardly passed through each deflecting plate set whereby to govern the degree of spin imparted to the total stream of air from both plate sets which following admission into said annular passage as aforesaid flows lengthwise along the fuel tube exterior and thence out of the annular passage at its said open end.

5. In a fuel burner having a centrally located fuel tube adapted to discharge into a furnace, the combination of means forming around said central tube an annular air passage closed at its end remote from the furnace and open at its other end for supplying air to mix with the fuel discharged into the furnace by the fuel tube, a windbox divided into first and second sections which respectively surround first and second portions of the axial length of said annular passage intermediate the passage's closed and open ends and each of which sections communicates circumferentially with the passage length surrounded thereby, a first set of deflecting plates positioned in circumferentially spaced relation around said first passage length concentrically between it and said surrounding first windbox section with individual plates disposed to direct windbox air substantially radially toward said central fuel tube without setting up air swirl therearound, a second set of deflecting plates positioned in circumferentially spaced relation around said second passage length concentrically between it and said surrounding second windbox section with individual second-set plates disposed to direct windbox air substantially tangent to said central fuel tube whereby to set up swirling air motion therearound, air supply means including first and second ducts respectively leading into said first and second windbox sections, and throttling means in said supply ducts for controlling the amount of air inwardly passed through each deflecting plate set whereby to govern the degree of spin imparted to the total stream of air from both plate sets which following admission into said annular passage as aforesaid flows lengthwise along the fuel tube exterior and thence out of the annular passage at its said open end.

VIRGINIUS Z. CARACRISTI.

REFERENCES CITED

The following references are of record in the file of this patent:

UNITED STATES PATENTS

| Number | Name | Date |
|---|---|---|
| 1,370,486 | Reid | Mar. 1, 1921 |
| 1,380,739 | Reid | June 7, 1921 |
| 1,618,808 | Burg | Feb. 22, 1927 |
| 1,795,454 | Van Brunt | Mar. 10, 1931 |
| 2,126,853 | Woolley | Aug. 16, 1938 |
| 2,399,234 | Kreisinger et al. | Apr. 30, 1946 |